US009176765B2

(12) United States Patent
Chen et al.

(10) Patent No.: US 9,176,765 B2
(45) Date of Patent: Nov. 3, 2015

(54) VIRTUAL MACHINE SYSTEM AND A METHOD FOR SHARING A GRAPHICS CARD AMONGST VIRTUAL MACHINES

(75) Inventors: Jun Chen, Beijing (CN); Yongfeng Liu, Beijing (CN); Chunmei Liu, Beijing (CN); Ke Ke, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1449 days.

(21) Appl. No.: 11/860,939

(22) Filed: Sep. 25, 2007

(65) Prior Publication Data
US 2008/0077917 A1 Mar. 27, 2008

(30) Foreign Application Priority Data

Sep. 25, 2006 (CN) .......................... 2006 1 0139360
Nov. 15, 2006 (CN) .......................... 2006 1 0146551

(51) Int. Cl.
G06F 9/455 (2006.01)
G06F 9/46 (2006.01)

(52) U.S. Cl.
CPC .. *G06F 9/45558* (2013.01); *G06F 2009/45579* (2013.01)

(58) Field of Classification Search
None
See application file for complete search history.

(56) References Cited

U.S. PATENT DOCUMENTS

| 4,833,596 | A | 5/1989 | Buckland et al. | |
|---|---|---|---|---|
| 7,065,630 | B1 * | 6/2006 | Ledebohm et al. | ........... 711/206 |
| 7,739,417 | B2 | 6/2010 | Liu | |
| 2005/0193396 | A1 * | 9/2005 | Stafford-Fraser et al. | ..... 719/328 |
| 2006/0005186 | A1 * | 1/2006 | Neil | ................................. 718/1 |
| 2006/0236094 | A1 | 10/2006 | Leung et al. | |
| 2007/0008324 | A1 | 1/2007 | Green | |
| 2007/0052715 | A1 | 3/2007 | Levit-Gurevich | |
| 2008/0005297 | A1 * | 1/2008 | Kjos et al. | ..................... 709/223 |
| 2008/0077917 | A1 | 3/2008 | Chen | |
| 2008/0215770 | A1 | 9/2008 | Liu et al. | |
| 2009/0172667 | A1 | 7/2009 | Wang et al. | |

OTHER PUBLICATIONS

Opferman, "Sharing Memory with the Virtual Machine," Nov. 1, 2005, http://www.ddj.com/cpp/184402033, Dr. Dobb's Online, 8 pages.

(Continued)

*Primary Examiner* — Corey S Faherty
(74) *Attorney, Agent, or Firm* — Patterson Thuente Pedersen, P.A.

(57) ABSTRACT

The present invention provides a virtual machine system and a method for sharing a graphics card amongst virtual machines. A VMM of the virtual machine system is provided with a resource-converting module, which converts data exchanged between a graphics card drive module of a GOS in the foreground and the graphics card based on a resource-converting table, and also intercepts accesses to the real graphics card by a GOS in the background and then responds to its operations on the graphics card. The VMM is further provided with a switching module, which alters a state of a VM based on a command for switching the VM, saves a graphics card state before the VM is switched to the background and restores the stored graphics card state to the graphics card when the VM is switched back to the foreground. Further, the GOSs each comprise a graphics card drive module corresponding to the real graphics card for accessing the real graphics card. The systems and the methods according to the present invention enable the GOSs to access the real graphics card, and also enable switching among a plurality of virtual machines.

27 Claims, 4 Drawing Sheets

(56) References Cited

OTHER PUBLICATIONS

King et al., "Operating System Support for Virtual Machines," Proceedings of the 2003 USENIX Technical Conference, 2003, 14 pages.

Sweeney, "Run multiple operating systems on a single PC with Virtual PC," TechRepublic, Jun. 9, 2003, http://articles.technrepublic.com.com/5100-10878_11-5035049.html, 14 pages.

Application and File History for U.S. Appl. No. 12/341,768, filed Dec. 24, 2008, Inventor: Wang.

Application and File History for U.S. Appl. No. 12/025,287, filed Feb. 4, 2008, inventors Liu et al.

* cited by examiner

PRIOR ART

VIRTUAL MACHINE SYSTEM AND A METHOD FOR SHARING A GRAPHICS CARD AMONGST VIRTUAL MACHINES

RELATED APPLICATION

The present application claims priority to Chinese Application No. 200610139360.5 filed Sep. 25, 2006, and Chinese Application No. 200610146551.4 filed Nov. 15, 2006, which are incorporated herein in their entirety by reference.

BACKGROUND OF THE INVENTION

1. Field of the Invention

The present invention relates to the computer field, more particularly, to a virtual machine system and a method for sharing a graphics card amongst virtual machines.

2. Description of the Prior Art

The virtualization technologies have wide applications in the computer field with the development of computer systems. Modern computers are capable of supporting a plurality of virtual machines by means of the virtualization technologies and running a separate Guest Operating System (GOS) respectively on each virtual machine.

In a virtual machine system, all the individual operating systems need to access the hardware. Among others, the access to a graphics card is relative complex. How to use the graphics card is an important factor which influences users' experiences. At present, primary virtualization technologies, such as VMWare, Virtual PC and Xen, adopt substantially same solutions, that is, to provide a virtualized graphics card for a GOS. The virtualized graphics card is a general graphics card, which can only achieve basic displaying functions and is rather different from a real graphics card.

FIG. 1 is a schematic view showing the access to a graphics card in a prior art virtual machine system. The virtual machine system comprises a Virtual Machine Monitor (VMM), a Service Operating System (SOS), and at least one GOS (exemplified by one GOS in FIG. 1).

Upon starting, the SOS scans a PCI bus to find a real graphics card and acquire information on the real graphics card, so as to allocate resources (IRQs, IOs and MMIOs) for the real graphics card for the present system. The SOS accesses the graphics card by a drive module for the real graphics card.

The SOS comprises at least one Device Model (DM), each corresponding to one GOS and providing a virtual graphics card for the GOS. Upon starting, the GOS scans the PCI bus. The scanning operation of the GOS is intercepted by the VMM, and is forwarded to a virtual PCI bus in the DM. The DM registers a virtual graphics card for the GOS. The GOS finds the virtual graphics card, and acquires information on the virtual graphics card, so as to allocate resources (IRQs, IOs and MMIOs) for the virtual graphics card for the present GOS, which are stored in a PCI configuration space for the virtual graphics card of the DM, from which the VMM obtains the resource ranges for the virtual graphics card (interrupt numbers, respective IO segments and respective MMIO segments). When the GOS accesses the virtual graphics card by a drive module for the virtual graphics card, the accessing operation (IOs, MMIOs) of the GOS is intercepted by the VMM. The VMM sends the accessing data to the DM. The accessing data are converted by the DM, and then are sent to the drive module for the real graphics card. The drive module for the real graphics card processes the received data, and then sends them to the graphics card.

The virtual machine system comprises one or more GOSs, each accessing the graphics card by the SOS. Therefore, only the SOS may see the real graphics card and access the real graphics card by the drive module for the real graphics card, while each GOS sees the virtual graphics card provided by the DM and accesses the graphics card by the drive module for the virtual graphics card. Thus, the virtual machine system performs displaying by the SOS, without accelerating properties such as 2D and 3D. The hardware accelerating properties of the graphics card may not be used by the users and even the function of 3D animation is not supported, affecting the displaying performance. Further, when the respective GOSs perform displaying, data must be transferred and the environments must be switched among GOSs, the DM of the SOS, the drive module for the real graphics card of the SOS, and the VMM, resulting in a lowered system efficiency.

Moreover, when the GOS accesses the virtual graphics card by the drive module for the virtual graphics card, the drive module for the virtual graphics card sends the graphics card accessing data of the GOS to the DM by a communication module of the VMM; the DM converts the graphics card accessing data, and then sends them to the graphics card by the drive module for the real graphics card, thus achieving the access of the GOS to the graphics card.

From the above, the GOS directly accesses the virtual graphics card provided by the DM by means of the drive module for the virtual graphics card. Because the virtual graphics card is a general graphics card only achieving the basis displaying functions, the hardware accelerating properties of the real graphics card are not available for the users and the 2D or 3D animation functions are not supported, resulting in a poor displaying performance.

SUMMARY OF THE INVENTION

It is an object of the present invention to provide a virtual machine system and a method for sharing a graphics card amongst virtual machines, enabling switching among a plurality of virtual machines while a Guest Operating System (GOS) is enabled to access the real graphics card.

It is another object of the present invention to provide a virtual machine system and a method for sharing a graphics card amongst virtual machines, wherein, a GOS in the foreground accesses the real graphics card directly by a real graphics card drive, and thus may make use of hardware accelerating properties of the real graphics card, resulting in an ensured displaying quality, while a GOS in the background access a virtual graphics card by a virtual graphics card drive, and accessing data thereof are discarded by a DM, resulting in that applications which need to access the graphics card in the background system run properly, and the normal display of the foreground system will not be disturbed.

According to one embodiment of the present invention, to achieve the above objects, there is provided a virtual machine system, comprising a Service Operating System (SOS), one or more Guest Operating Systems (GOSs), a Virtual Machine Monitor (VMM) and a graphics card.

The VMM is provided with a resource-converting module, which converts data exchanged between a graphics card drive module of a GOS in the foreground and the graphics card based on a resource-converting table, and also intercepts accesses to the real graphics card by a GOS in the background and then responds to its operations on the graphics card.

The VMM may further be provided with a switching module, which alters a state of a VM based on a command to switch the VM, saves a graphics card state before the VM is switched to the background and restores the stored graphics card state to the graphics card when the VM is switched back to the foreground.

The GOSs each comprise a graphics card drive module corresponding to the real graphics card for accessing the real graphics card.

In the above embodiment of a virtual machine system, the resource-converting module is further configured to modify the graphics card state data saved in the switching module based on the operations on the graphics card by the VM in the background.

Further, in the above embodiment of a virtual machine system, the resource-converting module is further configured to discard operations which do not effect a graphics card state register among the operations on the graphics card by the VM in the background.

In the above embodiment of a virtual machine system, the VMM further comprises: a communication module by which the SOS, the GOSs and the VMM communicate with each other.

In the above embodiment of a virtual machine system, the SOS comprises: Device Modules (DMs), which provide virtual PCI buses or PCI-E buses for the GOSs, and after receiving operations for scanning a PCI bus by the GOSs forwarded by the VMM, read information on the real graphics card from a PCI configuration space for the real graphics card, and register PCI devices or PCI-E devices containing the information on the real graphics card for the GOSs.

In the above embodiment of a virtual machine system, the resource-converting table is saved in a space of the VMM, or is saved in a context environment of the GOS virtual machine.

In the above embodiment of a virtual machine system, the resource-converting table comprises a virtual machine number, a device number, a Guest IO segment, a Guest MMIO segment, a Guest interrupt number, a Machine interrupt number, a Machine IO segment, and a Machine MMIO segment.

According to another embodiment of the present invention, to achieve the above objects better, there is provided a method for sharing a graphics card amongst virtual machines.

A resource-converting module of a VMM converts data exchanged between a graphics card drive module of a GOS in the foreground and the graphics card based on a resource-converting table, and also intercepts accesses to the real graphics card by a GOS in the background and then responds to its operations on the graphics card.

A switching module of the VMM alters a state of a VM based on a command to switch the VM, saves a graphics card state before the VM is switched to the background and restores the stored graphics card state to the graphics card when the VM is switched back to the foreground.

The GOSs each comprise a graphics card drive module corresponding to the real graphics card.

In the above embodiment, the resource-converting module also modifies the graphics card state data saved in the switching module based on the operations on the graphics card by the VM in the background.

In the above embodiment, the switching module invokes a standard BIOS, performs a VGA BIOS, or directly operates the graphics card, to save the graphics card state of the GOS in the foreground to be switched to the background into the graphics card state data of the GOS.

In the above embodiment, the switching module invokes a standard BIOS, performs a VGA BIOS, or directly operates the graphics card, to restore the graphics card state data of the GOS to be switched to the foreground to the real graphics card.

In the above embodiment, whether the GOS is in the foreground or in the background is determined by an identification set for the VM to which the GOS is pertaining for identifying whether it is in the foreground or in the background.

In the above embodiment, the resource-converting table is saved in a space of the VMM, or is saved in a context environment of the GOS virtual machine.

In the above embodiment, the resource-converting table comprises a virtual machine number, a device number, a Guest IO segment, a Guest MMIO segment, a Guest interrupt number, a Machine interrupt number, a Machine IO segment and a Machine MMIO segment.

According to the method and the system according to the first and second embodiments of the present invention, the resource-converting module provided in the VMM converts the data exchanged between the graphics card drive module of the GOS in the foreground and the graphics card, and intercepts the accesses to the real graphics card by the GOS in the background and then responds to its operations on the graphics card. As a result, it is ensured that only one GOS may access the real graphics card at one time. Also, because the PCI buses (PCI-E buses) for the GOSs contain the information on the real graphics card and the GOSs comprise the graphics card drives corresponding to the real graphics card, the accessing is performed in a manner of accessing the real graphics card, thus the real graphics card may be accessed.

Also, according to the methods and the systems of the first and second embodiments of the present invention, upon switching, the graphics card state corresponding to the GOS before the switching is saved, and the changes of the graphics card state induced by the operations on the graphics card by the GOS in the background are updated accordingly. As a result, after the GOS is restored to the foreground, the saved graphics card state is restored to the real graphics card, thus the consistency of the state is maintained, efficiently solving the problem of display switching among a plurality of virtual machines.

According to a third embodiment of the present invention, there is provided a virtual machine system, wherein VMM comprises a resource-converting module, an SOS comprises a display switching drive, and GOSs each comprise a display switching drive and a real graphics card drive.

The real graphics card drives of the GOSs are configured to send graphics card accessing data of the GOSs to the resource-converting module of the VMM.

The resource-converting module of the VMM is configured to store correspondences between resources allocated for a graphics card by the SOS and those allocated for the graphics card by the GOSs therein, and converts IO addresses and MMIO addresses of the graphics card accessing date from the GOSs based on the correspondences and then send them to the graphics card.

The display switching drive of the SOS is configured to send a message to switch to the foreground to the display switching drive of the GOS to be switched to the foreground by a communication module of the VMM on receipt of a display switching message.

The display switching drives of the GOSs are configured to enable the virtual graphics card drives and disable the real graphics card drives on receipt of a message, including an instruction to switch to the background, and disable the virtual graphics card drives and enable the real graphics card drives on receipt of the message to switch to the foreground sent by the display switching drive of the SOS through the communication module of the VMM.

Virtual graphics card drives of the GOSs are configured to send the graphics card accessing data of the GOSs to DMs by the communication module.

The DMs of the virtual machine system are further configured to discard the graphics card accessing data when receiving the graphics card accessing data sent by the virtual graphics card drives through the communication module of the VMM.

The resource-converting module of the VMM is further configured to receive interrupt requests (IRQs) from the graphics card, and convert the IRQs to interrupt numbers for the GOSs based on the stored correspondences and then send them to the real graphics card drives of the GOSs. The real graphics card drives of the GOSs are further configured to perform corresponding processing on the IRQs.

The display switching message received by the display switching drive of the SOS is an externally triggered switching message. The display switching drive of the SOS is further configured to send the message to switch to the background to the GOS to be switched to the background by the communication module of the VMM.

The message including the instruction to switch to the background received by the display switching drives of the GOSs is a display switching message sent by applications of the GOSs. The display switching drives of the GOSs are further configured to send the display switching message to the display switching drive of the SOS by the communication module of the VMM.

According to a fourth embodiment of the present invention, there is provided a method for sharing a graphics card amongst virtual machines.

The method of this embodiment includes: allocating the real graphics card to GOSs, also allocating virtual graphics cards to the GOSs, and loading corresponding real graphics card drives and virtual graphics card drives; on display switching, disabling the real graphics card drive of a GOS in the background and enabling the virtual graphics card drive of the GOS in the background, as well as disabling the virtual graphics card drive of a GOS in the foreground and enabling the real graphics card drive of the GOS in the foreground; the GOS in the background accessing the virtual graphics card by the virtual graphics card drive, and an SOS discarding graphics card accessing data of the GOS; the GOS in the foreground accessing the real graphics card by the real graphics card drive.

The GOS in the foreground assessing the real graphics card further comprises the sub-steps of:
(a) sending graphics card accessing data of the GOS in the foreground to a VMM by the real graphics card drive; and
(b) the VMM converting IO addresses and MMIO addresses of the graphics card accessing data based on correspondences between resources allocated for the graphics card by the SOS and resources allocated for the graphics card by the GOS in the foreground, and then sending them to the graphics card.

Further, after sub-step (b), it further comprises the steps of: the VMM receiving IRQs from the graphics card, converting the IRQs to interrupt numbers for the GOS in the foreground based on the correspondences, and then sending them to the real graphics card drive of the GOS in the foreground, which in turn performs corresponding processing on the IRQs.

The third and fourth embodiments of the present invention have a number of advantages over the prior art.

For example, two graphics cards are allocated to each GOS: one real graphics card, one real graphics card. The GOS in the foreground directly accesses the real graphics card by the real graphics card drive, and thus may make use of hardware accelerating properties of the real graphics card, resulting in an ensured displaying quality. The GOS in the background accesses the virtual graphics card by the virtual graphics card drive, and the graphics card accessing data thereof are discarded by the DM. The result is that applications which need to access the graphics card in the background system run properly, and the normal display of the foreground system will not be disturbed.

DETAILED DESCRIPTION OF PREFERRED EMBODIMENTS

A virtual machine system according to one embodiment of the present invention comprises a Service Operating system (SOS), one or more Guest Operating Systems (GOSs), a Virtual Machine Monitor (VMM) and a graphics card.

The VMM comprises a communication module, a resource-converting module and a switching module.

A communication module is connected respectively to the SOS and the GOSs for performing communications among the SOS, the GOSs and the VMM. The VMM communicates with the SOS and the GOSs by an interrupt or an Event Channel, the SOS communicates with the VMM by means of hypercall, and the GOSs communicate with the VMM by means of vmcall.

The resource-converting module connects graphics card drive modules of the GOSs to the graphics card. The resource-converting module converts the data exchanged between the graphics card drive module of a GOS in the foreground and the graphics card based on a resource-converting table, and also intercepts accesses to the real graphics card by a GOS in the background and then responds to its operations on the graphics card. The converting operation comprises: based on the resource-converting table, performing IO address conversion on the graphics card accessing data from the GOS, or mapping a MMIO to a physical MMIO of the graphics card and then sending it to the real graphics card; and based on the resource-converting table, converting an IRQ received from the graphics card to an interrupt number for the GOS and then sending it to the GOS.

Figure 1:
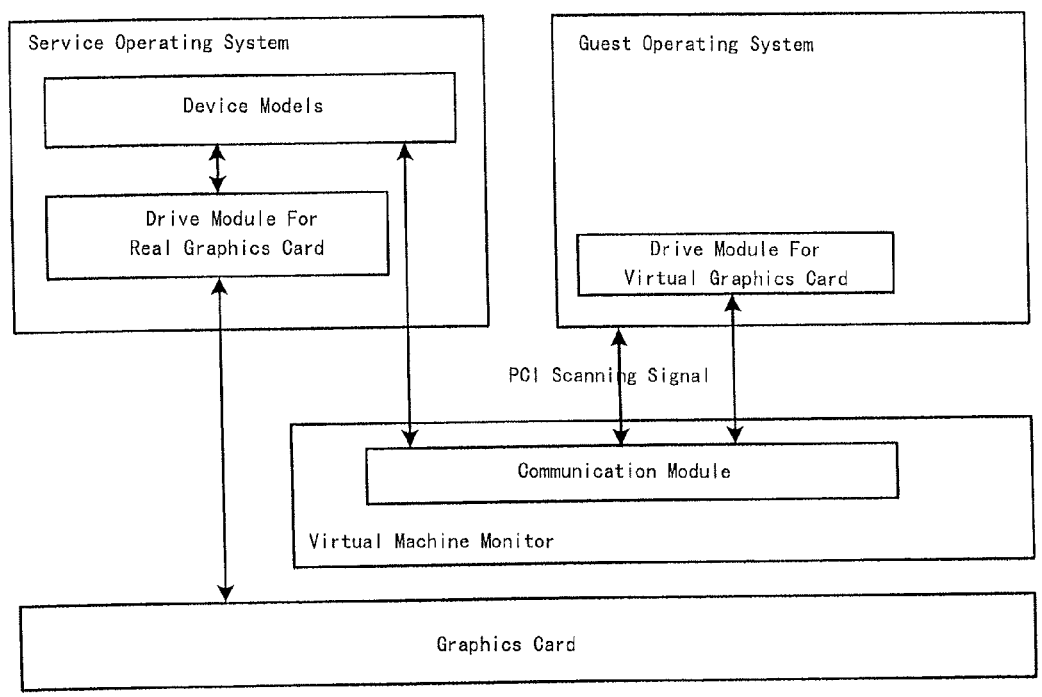
FIG. 1 is a schematic view showing the access to a graphics card in a prior art virtual machine system.
Figure 2:
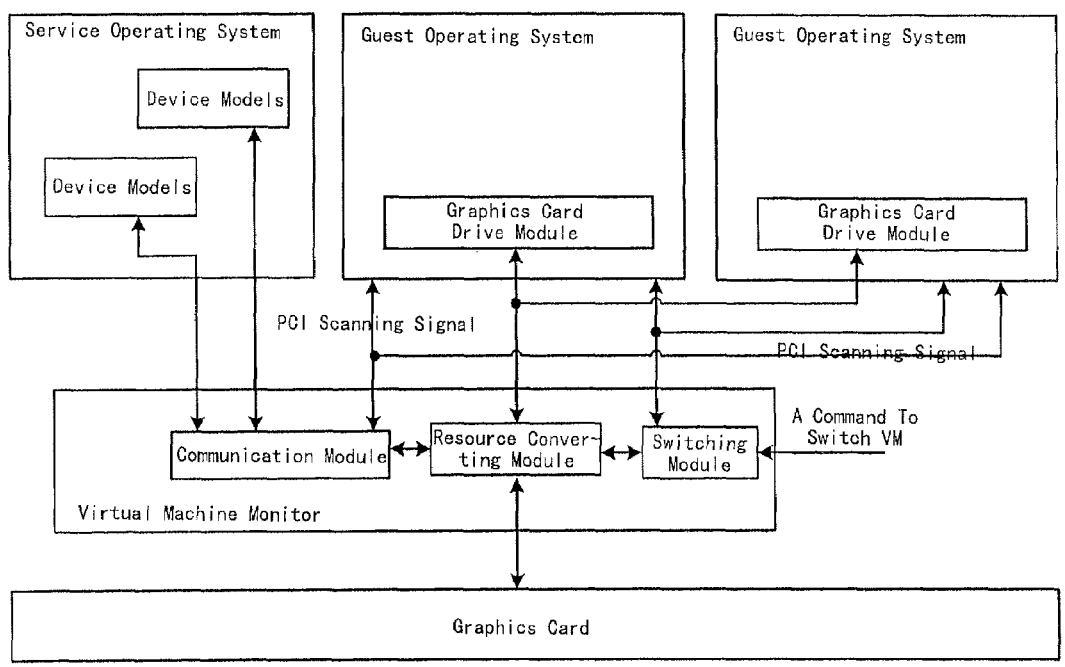
FIG. 2 is a schematic structure view showing a virtual machine system according to one embodiment of the present invention.

The switching module is provided for altering a state of a VM based on a command to switch the VM, saving a graphics card state before the VM is switched to the background and restoring the stored graphics card state to the graphics card when the VM is switched back to the foreground. As shown in FIG. 2, the switching module acquires the graphics card state through the resource-converting module. Of course, it may acquire the state directly from the graphics card.

The SOS comprises Device Models (DMs) for providing virtual PCI buses (PCI-E buses) for the GOSs. Also, the DMs, after receiving operations for scanning a PCI bus by the GOSs forwarded by the VMM, read information on the real graphics card from a PCI configuration space for the real graphics card, and register PCI devices (PCI-E devices) containing the information on the real graphics card for the GOSs.

The GOSs each comprise a graphics card drive module corresponding to the real graphics card for accessing the real graphics card.

After finding the graphics card and acquiring the information on the graphics card, the GOS allocates resources (IRQ, IO, MMIO) for the graphics card to the present system, and stores configuration information on the resources for the graphics card in a PCI configuration space for the virtual PCI bus (PCI-E bus) of the DM.

The resource-converting table described above is generated during the process of configuring the resources for the graphics card. The configuring process is performed as follows. The SOS starts and scans the PCI bus to acquire the information on the graphics card and allocate the resources (IRQ, IO and MMIO) for the graphics card. The GOSs start and scan the virtual PCI buses to find the real graphics card provided by the DMs, acquire the information on the graphics card, and allocate the resources (IRQ, IO and MMIO) for the graphics card. The DMs are responsible to parse the allocating of the resources for the graphics card by the GOSs. The DMs generate the resource-converting table according to the information on the resource configuration for the graphics card by the SOS and the information on the resource configuration for the graphics card by the GOSs. The resource-converting table includes correspondences between IOs, IRQs and MMIOs allocated for the graphics card by the SOS and those allocated by the GOSs.

The resource-converting table may be stored by the VMM in its own space, or in a context environment of the GOS virtual machines. The resource-converting table comprises a virtual machine number, a device number, a Guest IO segment, a Guest MMIO segment, a Guest interrupt number, a Machine interrupt number, a Machine IO segment, and a Machine MMIO segment. The virtual machine number represents a running environment of the GOSs. The device number identifies the graphics card, and may be composed of a bus number, a device number and a function number on the real bus of the graphics card. The segments each include a start address and a length, or a start address and an end address. The Guest IO represents the resources allocated for the graphics card by the GOSs on scanning the virtual buses. The Guest MMIO represents the MMIO resources allocated for the graphics card by the GOSs on scanning the virtual buses. The Guest interrupt number represents the interrupt numbers allocated for the graphics card by the GOSs on scanning the virtual buses. The Machine interrupt number represents the interrupt numbers allocated for the graphics card by the SOS on scanning the real bus. The Machine IO represents the IO resources allocated for the graphics card by the SOS on scanning the real bus. The Machine MMIO represents the MMIO resources allocated for the graphics card by the SOS on scanning the real bus.

The access to the graphics card by the above virtual machine system comprises operations of the SOS on the graphics card and operations of the GOSs on the graphics card.

Upon starting, the SOS scans the PCI bus to find the real graphics card, acquire the information on the real graphics card, and allocate the resources (IRQ, IO and MMIO) for the real graphics card for the present system. The SOS accesses the graphics card by a drive module for the real graphics card.

Upon starting, each GOS scans the PCI bus. The scanning operation of the GOS is intercepted by the VMM, and is forwarded to the virtual PCI bus in the DM by the communication module. The DM reads the information on the real graphics card from the PCI configuration space for the real graphics card, and registers the information on the real graphics card for the GOS. The GOS finds the graphics card, and acquires the information on the graphics card, so as to configure the resources (IRQ, IO and MMIO) for the graphics card, which are stored in the PCI configuration space for the virtual graphics card of the PCI bus virtualized by the DM, from which, the VMM obtains the resource ranges for the virtual graphics card (interrupt numbers, respective IO segments and respective MMIO segments) and establishes the resource-converting table between the resources for the graphics card of the GOS and the resources for the real graphics card. The GOS accesses the graphics card by the graphics card drive module. The accessing operations (IO, MMIO) to the graphics card by the GOS are intercepted by the resource-converting module of the VMM. If the GOS is in the foreground, the VMM, based on the resource-converting table, sends the converted operations to the real graphics card, and converts the IRQs returned by the graphics card to the Guest interrupt numbers for the GOS and then sends them to the GOS. As for the GOS in the background, the access thereof to the real graphics card is intercepted by the resource-converting module, and thus the GOS is prohibited from accessing the real graphics card.

According to one embodiment, it is determined whether the GOS is in the foreground or background in the following manner: For the VMM, a flag is set for a VM to which each GOS is pertaining for identifying whether it is in the foreground or background. When the virtual machine gains a time slice to run, the resource-converting module determines whether it is in the foreground or background based on the flag of the VM. The VMM ensures that only one VM, including the VM to which the SOS is pertaining, at most is in the foreground.

Hereinafter, a method according to one embodiment of the present invention is further described in detail, taken in conjunction with the switching of the VM.

The switching refers to identify a VM in the foreground as in the background and a GOS in the background, which is not displayed, as in the foreground. For each VM in the background, the VMM, after intercepting the operations of the VM on the graphics card, does not convert the operations to the real graphics card. Only with respect to the VM identified as in the foreground, the VMM, after intercepting the operations of the VM on the graphics card, converts the operations to the real graphics card by the resource-converting module. Thus, it is ensured that only one GOS may access the real graphics card at one time.

There are states for the graphics card. It is assumed that there are three virtual machines, VM1, VM2 and VM3. When the VM1 in the foreground operates the graphics card, the graphics card is brought in a state of STATE1. Afterwards, the VM1 is identified as in the background and the VM2 is identified as in the foreground due to switching. Therefore, the VM1 may not operate the graphics card, which now is operated by the other virtual machine VM2, resulting in a state of STATE2 of the graphics card.

If the VM1 is switched back then, the GOS of the VM1 considers that the graphics card is still in the state of STATE1, which, however, now is in the state of STATE2. If the GOS of the VM1 operates the graphics card as if it is in the state of STATE1, abnormalities and errors may occur, thus an operation for saving and restoring the graphics card state is necessary.

Further, the VM in the background still considers that it consumes the graphics card exclusively. Although the operations of the VM will not be sent to the real graphics card, it still considers that its operations have succeeded and altered the state of the graphics card. When the VM returns to the foreground, it continues to operate the real graphics card based on the state as if the graphics card has been operated when it is in the background. Therefore, it is necessary to track the state variations induced by the operations on the graphics card by the VM in the background.

The above problems are respectively explained in detail below.

The saving and restoring of the graphics card state may be achieved by directly invoking a BIOS. For example, among the functions of the interrupt 10h, ah=1C and al=1 correspond to the saving of the graphics card state, and ah=1C and al=2 correspond to the restoring of the graphics card state.

If a VGA BIOS of the graphics card manufacturer provides the operation for saving and restoring the graphics card state, it is possible to directly invoke the VGA BIOS so as to provide an interface.

Furthermore, it is possible to program the graphics card so as to read out a graphics card register thereof and save the contents thereof, which are then written back to the graphics card register.

Therefore, the switching may be performed in the following manner according to a method of one embodiment of the present invention.

A graphics card state-saving module is provided in the VMM for saving the graphics card state of the VM in the foreground before the executing of the VM is stopped. When the VM is switched back to the foreground, the saved graphics card state is restored to the graphics card, thus ensuring the consistency of the state of the graphics card.

Also, the switching may be performed in the following manner according to a method of one embodiment of the present invention, in order to enable the VM in the background to run while the consistency of the state is ensured.

A graphics card state register corresponding to each GOS is provided in the VMM. When the GOS is switched from the foreground to the background, firstly, the current state of the real graphics card is saved in the graphics card state register corresponding to the VM, and then the VM is in the background and continues to operate the graphics card. However, at this time, the resource-converting module does not convert the operations of the VM to the real graphics card (that is, the VM may not operate the real graphics card). The resource-converting module intercepts the operations of the GOS on the graphics card, and then updates the corresponding graphics card state register based on the intercepted operation data. The operations which do not effect on the graphics card state register, for example, an operation on a framebuffer of the graphics card, are directly discarded. When the VM is switched back to the foreground, the resource-converting module resorts the data of the graphics card state register of the VM to the real graphics card.

Also, with respect to the operations for switching the VM, the keyboard operations may be intercepted by the VMM. If the intercepted operation is a predetermined switching operation command (for example, Alt+F2 so as to switch the VM2 to the foreground), it may be a command acquired by the SOS through a network, and then is sent to the VMM.

Also, it is dynamically changed which one is in the foreground or background. An example is that every time a VM is enabled, the VM is identified as in the foreground, while a VM originally in the foreground is identified as in the background. The VMM determines the VM is in the foreground or background based on the identification of the VM, and performs corresponding processing on the operations of the graphics card.

The VMM restores the graphics card state of the GOS to be switched to the foreground to the real graphics card, for example, by invoking the standard BIOS, performing the VGA BIOS, or directly accessing the graphics card, or the like, and allows the GOS to directly access the real graphics card and identifies the GOS as in the foreground.

As for the GOS in the background, the VMM intercepts the access of the GOS to the real graphics card, and responds to the operations of the GOS on the graphics card, such as mode switching, resolution changing, and the like. However, the VMM does not perform the specific IO operations on the real graphics card, and directly discards the operations on the framebuffer of the graphics card. That is to say, for the GOS in the background, the VMM simulates the IO operations on the real graphics card by the GOS, and records the states of the graphics card seen by the GOS. The operations on the framebuffer are directly discarded, and will not be written into the real graphics card. Thus, the GOS in the background considers that it operates the real graphics card, but actually it does not effect the real graphics card, without disturbing the display of the GOS in the foreground.

The so-called intercepting in the virtual machine field refers to when the GOS performs some operations which cannot be performed by the GOS; the executing by the CPU is trapped in the VMM, that is, performed by the VMM. The VMM, in place of the GOS, performs some operations (alternatively, performs no operations), and then the GOS is switched back to perform the operations.

The mode switching and resolution changing relate to changing the state of the graphics card. The so-called simulating refers to the VMM instead of the real graphics card responding to the operations of the GOS on the graphics card. If the GOS in the background wants to read the state of the graphics card, the VMM returns the graphics card state in the VM rather than the state of the real graphics card. As for writing the graphics card, only the graphics card state in the VM is updated, while the real graphics card is not written.

Figure 3:
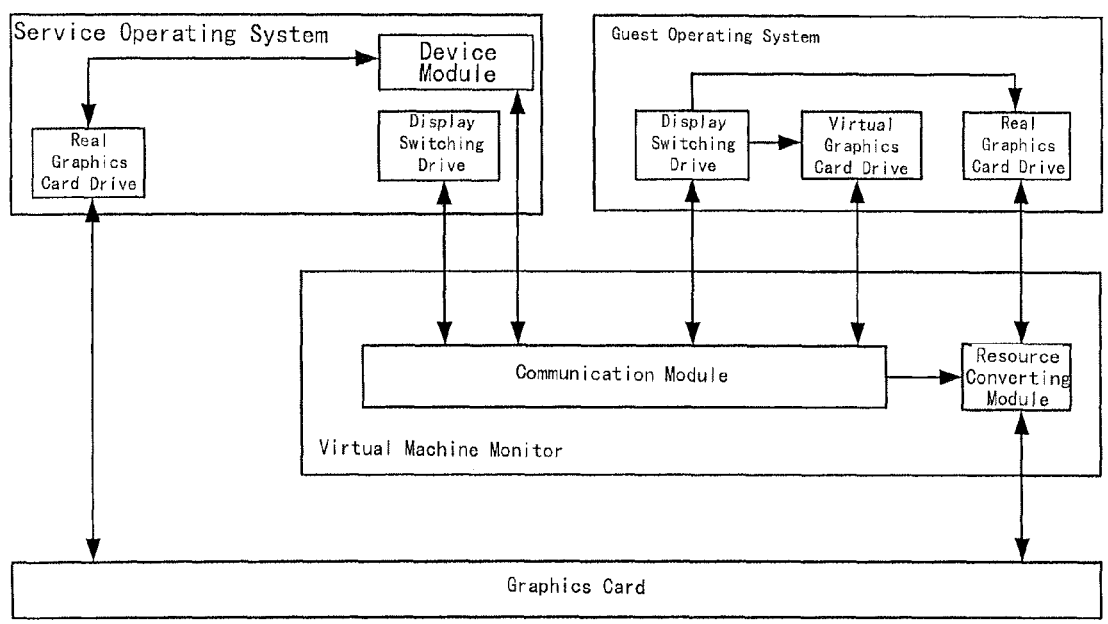
FIG. 3 is a schematic view showing a virtual machine system according to another embodiment of the present invention.

As shown in FIG. 3, a virtual machine system according to another embodiment of the present invention comprises a VMM, an SOS, at least one GOS, and a graphics card. The VMM comprises a communication module and a resource-converting module. The SOS comprises a real graphics card drive, a DM and a display switching drive. The GOS comprises a real graphics card drive, a virtual graphics card drive and a display switching drive.

The VMM communicates with the SOS and the respective GOSs by the communication module. The VMM sends data to the SOS or GOSs by an interrupt or an Event Channel of the communication module, the SOS sends data to the VMM by means of hypercall of the communication module, and the GOSs send data to the VMM by means of vmcall of the communication module.

The real graphics card drives of the GOSs are provided for sending graphics card accessing data of the GOSs to the resource-converting module of the VMM.

Because the resource configurations for the graphics card by the GOSs are different from the resource configuration for the graphics card by the SOS, if the GOSs are to access the real graphics card directly, it is necessary to perform resource converting first, which is performed by the resource-converting module. The resource-converting module has a resource-converting table stored therein, which includes correspondences between the resource configuration for the graphics card by the SOS and the resource configuration for the graphics card by the GOSs, specifically including correspondences between IOs and MMIOs allocated for the graphics card by the SOS and those allocated by the GOSs. The resource-converting module converts the IO addresses and MMIO addresses of the graphics card accessing data from the GOSs based on the resource-converting table, and then sends them to the graphics card.

The resource-converting table further includes correspondences between IRQs allocated for the graphics card by the SOS and those allocated by the GOSs. When responding to the accesses of the GOSs, the graphics card needs to send IRQs to the GOSs. The resource-converting module converts the IRQs received by the VMM from the graphics card to interrupt numbers for the GOSs based on the resource-converting table, and then sends them to the real graphics card drives of the GOSs, so that the real graphics card drives perform corresponding processing on the IRQs.

The resource-converting table is generated during the process of configuring the resources for the graphics card. Upon starting, the SOS and the GOSs configure the resources for the graphics card respectively. The DM acquires the information on the resource configuration for the graphics card by the SOS and the information on the resource configuration for the graphics card by the GOSs, generates the resource-converting table according to the information on the resource configurations, and sends the resource-converting table to the resource-converting module by the communication module.

Thus, with cooperation of the DM and the VMM, the GOSs may directly access the hardware of the graphics card by the real graphics card drives, thus may make use of the hardware accelerating properties of the real graphics card, resulting in an ensured displaying quality.

The virtual graphics card drives of the GOSs are provided for sending the graphics card accessing data of the GOSs to the DM by the communication module.

In one embodiment, only one of the real graphics card drives and the virtual graphics cards of each GOS acts at one time. That is, when the GOS is in the foreground, the real graphics card drive acts, while when the GOS is in the background, the virtual graphics card drive acts. This is achieved by the display switching drives of the SOS and the GOSs. There are two ways to trigger the display switching. One way is to receive an external trigger message by the SOS. For example, the user performs switching by hot keys. The other way is to send a switching message to the display switching drive of the GOS in the foreground by applications of the GOS in the foreground so as to trigger the switching.

In the case of external triggering, the display switching drive of the SOS, upon receiving a display switching message triggered externally, sends a message to switch to the background to the display switching drive of the GOS to be switched to the background, and also sends a message to switch to the foreground to the display switching drive of the GOS to be switched to the foreground. Having received the message to switch to the background, the display switching drive of the GOS enables the virtual graphics card drive, and disables the real graphics card drive. Having received the message to switch to the foreground, the display switching drive of the GOS enables the real graphics card drive, and disables the virtual graphics card drive.

In the case of triggering by the applications, the display switching drive of the GOS in the foreground, upon receiving a display switching message from the applications of the present GOS, enables the virtual graphics card drive, and disables the real graphics card drive. The GOS in the foreground further sends the display switching message to the display switching drive of the SOS by the communication module of the VMM. The display switching drive of the SOS further sends a message to switch to the foreground to the display switching drive of the GOS to be switched to the foreground by the communication module of the VMM. Having received the message to switch to the foreground, the display switching drive of the GOS enables the real graphics card drive, and disables the virtual graphics card drive.

In the virtual machine system according to the present embodiment, there is a possibility that a plurality of GOSs write the graphics card concurrently, thus confusing the displaying of the display. This is because that the GOS in the foreground directly accesses the graphics card by the real graphics card drive, while the GOS in the background accesses the virtual graphics card by the virtual graphics card drive, and the graphics card accessing data thereof, after being converted by the DM, are also sent to the graphics card by the real graphics card drive of the SOS. Therefore, the DM of the virtual machine system according to the present embodiment is further configured to discard the graphics card accessing data when receiving the graphics card accessing data from the virtual graphics card drive of the GOS by the communication module of the VMM. Thus, the problem of concurrently writing the graphics card by a plurality of GOSs is solved. Also, the applications of the operating systems in the background, which need to access the graphics card, may continue to run properly.

In the virtual machine system as shown in FIG. 3, when the GOS is in the foreground, it is possible to modify the value of the graphics card register so as to change the displaying mode. As a result, after the GOS in the background is switched to the foreground, it is necessary to reset the displaying mode. Moreover, after the display switching, if the screen is not refreshed, the contents displayed by the display are the contents before the display switching, because the contents of the graphics card memory are not updated. In some situations, this may be inconvenient. Another embodiment of the present invention, as depicted in FIG. 4, addresses this possible inconvenience.

Figure 4:
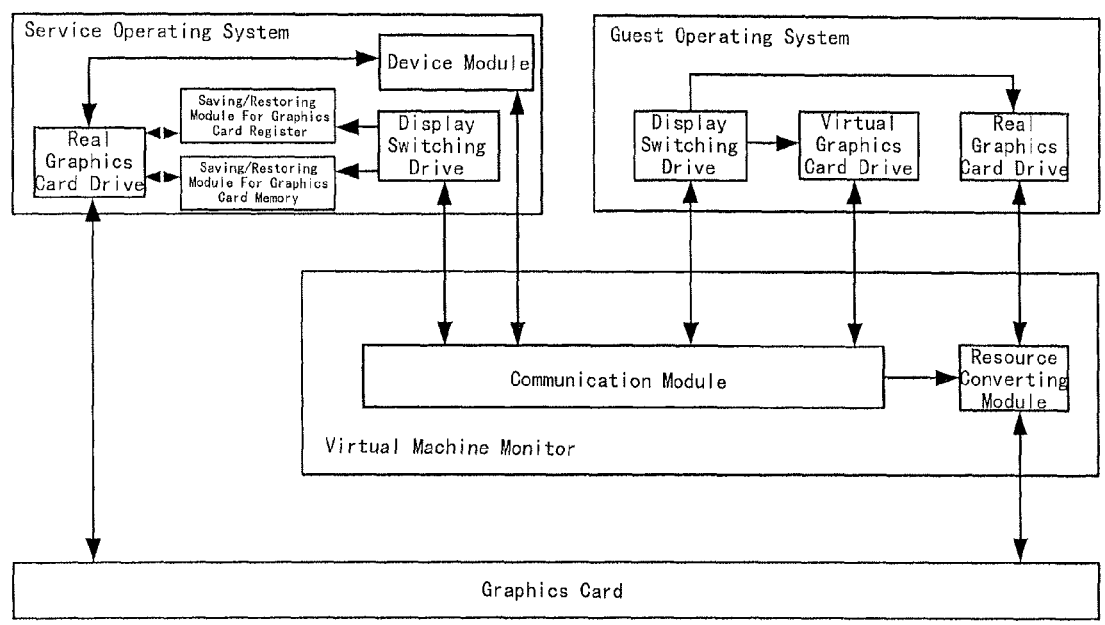
FIG. 4 is a schematic view showing yet another embodiment that is a modification of the virtual machine system shown in FIG. 3.

FIG. 4 shows a modification of the virtual machine system shown in FIG. 3, wherein the SOS further comprises a saving/restoring module for the graphics card register and/or a saving/restoring module for the graphics card memory.

The display switching drive of the SOS, on receipt of the display switching message, sends a graphics card register saving/restoring signal to the saving/restoring module for the graphics card register, which in turn saves the current value of the graphics card register. After the current value of the graphics card register is successfully saved, the display switching drive of the SOS restores the graphics card register value corresponding to the GOS to be switched to the foreground, that is, writes the corresponding value of the graphics card register to the graphics card register. Thus, there is no need to reset the displaying mode upon display switching.

Further, the display switching drive of the SOS, on receipt of the display switching message, sends a graphics card memory saving/restoring signal to the saving/restoring module for the graphics card memory, which in turn saves the current contents of the graphics card memory. After the current contents of the graphics card memory are successfully saved, the display switching drive of the SOS restores the graphics card memory contents corresponding to the GOS to be switched to the foreground, that is, writes the corresponding contents of the graphics card memory to the graphics card memory. Thus, it is possible to display correct contents without refreshing the screen upon display switching.

In one embodiment, the display switching drive of the GOS is further configured to determine whether the switching requirements are satisfied or not when the present GOS is in the foreground and is to perform display switching. Only if the switching requirements are satisfied, the normal switching is performed. If the switching requirements are not satisfied, the switching will not be performed. The display switching drive of the GOS in the foreground further prompts the user for the reasons why the switching requirements are not satisfied currently, and for solutions, such as shutting off corresponding applications. After the user removes the causes by which the switching requirements are not satisfied, the normal switching is performed.

The switching requirements may be that none of the applications of the present GOS uses the graphics card exclusively; and/or none of the applications of the present GOS uses the displaying properties which are not supported by the virtual graphics card; and/or the virtual graphics card of the present GOS is properly loaded.

In one embodiment, in order to ensure Direct Memory Access (DMA), the VMM runs at the high end of the memory, while the GOSs run at the low end of the memory. Thus, the physical memory addresses of the GOSs are consistent with the memory addresses of the machine, so the GOSs meet the requirements for DMA without modification. Also, the SOS is a modified system per se, and meets the requirements for DMA. It is to be understood by those skilled in the art that it is possible for the GOSs not to run at the low end of the memory, especially when there are a plurality of GOSs running concurrently. It is possible to intercept DMA instructions by the VMM and modify the memory addresses so as to achieve DMA, or to directly modify the processes of the GOS with respect to the memory.

According to the above description of the virtual machine system, a method for sharing the graphics card amongst virtual machines according to one embodiment of the present invention is explained hereinafter.

The method for sharing the graphics card amongst virtual machines according to the present embodiment comprises:
 allocating the real graphics card to the GOSs, also allocating the virtual graphics cards to the GOSs, and loading the corresponding real graphics card drives and virtual graphics card drives;
 on display switching, disabling the real graphics card drive of the GOS in the background and enabling the virtual graphics card drive of the GOS in the background, as well as disabling the virtual graphics card drive of the GOS in the foreground and enabling the real graphics card drive of the GOS in the foreground;
 the GOS in the foreground accessing the real graphics card by the real graphics card drive, and
 the GOS in the background accessing the virtual graphics card by the virtual graphics card drive.

To prevent a plurality of GOSs from writing the graphics card concurrently, when the GOS in the background accesses the virtual graphics card by the virtual graphics card drive, the SOS discards the graphics card accessing data of the GOS.

In particular, the step of the GOS in the foreground accessing the real graphics card by the real graphics card drive comprises:
 (a) sending the real graphics card accessing data of the GOS in the foreground to the VMM by the real graphics card drive; and
 (b) the VMM converting the IO addresses and MMIO addresses of the graphics card accessing data and then sending them to the graphics card based on the correspondences between the resources allocated for the graphics card by the SOS and the resources allocated for the graphics card by the GOS.

Further, after step (b), it further comprises: the VMM receiving the IRQs from the graphics card, converting the IRQs to the interrupt numbers for the GOS in the foreground based on the correspondences, and then sending them to the real graphics card drive of the GOS in the foreground, which in turn performs corresponding processing on the IRQs.

Specifically, the correspondences comprise the correspondences between the IOs, MMIOs and/or IRQs allocated for the graphics card by the SOS and those allocated by the GOS.

To ensure that there is no need to readjust the displaying mode after display switching, before step (a), it comprises a step of saving the displaying mode corresponding to the GOS in the foreground when the GOS in the foreground is switched to the background and restoring the displaying mode corresponding to the GOS in the background when the GOS in the background is switched to the foreground.

To ensure that there is no need to refresh the screen after display switching, before step (a), it comprises a step of saving the contents of the graphics card memory corresponding to the GOS in the foreground when the GOS in the foreground is switched to the background and restoring the contents of the graphics card memory corresponding to the GOS in the background when the GOS in the background is switched to the foreground.

According to one embodiment of the virtual machine system and the method for sharing the graphics card amongst virtual machines according to one embodiment of the present invention, the GOSs may access the real graphics card. The display displays the contents which are controlled by the VMM based on the switching of the system, and always displays the contents of the system switched to the foreground. Also, the hardware accelerating properties may be used, resulting in an ensured displaying quality.

The above embodiments are provided for the purpose of example only, and are not intended to limit the present invention. It is to be understood by those skilled in the art that there may be various modifications or replacements to the embodiments without departing from the scope and the spirit of the present invention, and they shall fall into the scope defined by the appended claims.

What is claimed is:

1. A virtual machine system, comprising a Service Operating System (SOS), one or more Guest Operating Systems (GOSs), a Virtual Machine Monitor (VMM) and a real graphics card, wherein,
 the VMM is provided with a resource-converting module that converts data exchanged between a graphics card drive module of a GOS in the foreground and the real graphics card based on a resource-converting table, and also intercepts accesses to the real graphics card by a GOS in the background and then simulates operations corresponding to the accesses, which the GOS in the background is attempting to perform on the real graphics card, in such a manner that the operations do not actually occur on the real graphics card;
 the VMM is further provided with a switching module, which alters a state of a virtual machine (VM) based on a command to switch the VM, saves a graphics card state before the VM is switched to the background and restores the stored graphics card state to the real graphics card when the VM is switched back to the foreground; and
 the GOSs each comprise a graphics card drive module corresponding to the real graphics card for accessing the real graphics card.

2. The virtual machine system according to claim 1, wherein the resource-converting module is further configured to modify the graphics card state data saved in the switching module accordingly based on the operations on the real graphics card by the VM in the background.

3. The virtual machine system according to claim 2, wherein the resource-converting module is further configured to discard operations which do not effect a graphics card state register among the operations on the real graphics card by the VM in the background.

4. The virtual machine system according to claim 1, wherein the VMM further comprises:
a communication module by which the SOS, the GOSs and the VMM communicate with each other.

5. The virtual machine system according to claim 1, wherein the SOS comprises:
Device Modules (DMs), which provide virtual PCI buses or PCI-E buses for the GOSs, and after receiving operations for scanning a PCI bus by the GOSs forwarded by the VMM, read information on the real graphics card from a PCI configuration space for the real graphics card, and register PCI devices or PCI-E devices containing the information on the real graphics card for the GOSs.

6. The virtual machine system according to claim 1, wherein the resource-converting table is saved in a space of the VMM, or is saved in a context environment of the GOS virtual machine.

7. The virtual machine system according to claim 6, wherein the resource-converting table comprises a virtual machine number, a device number, a Guest IO segment, a Guest MMIO segment, a Guest interrupt number, a Machine IO segment, a Machine MMIO segment, and a Machine interrupt number.

8. A method for sharing a real graphics card amongst virtual machines, comprising:
converting data exchanged between a graphics card drive module of a GOS in the foreground and the real graphics card based on a resource-converting table using a resource-converting module of a VMM;
intercepting accesses to the real graphics card by a GOS in the background and then simulating operations corresponding to the accesses, which the GOS in the background is attempting to perform on the real graphics card in such a manner that the operations do not actually occur on the real graphics card; and
altering a state of a VM based on a command to switch the VM using a switching module of the VMM, saving a graphics card state before the VM is switched to the background and restoring the stored graphics card state to the real graphics card when the VM is switched back to the foreground, wherein
the GOSs each comprise a graphics card drive module corresponding to the real graphics card.

9. The method according to claim 8, wherein the resource-converting module also modifies the graphics card state data saved in the switching module based on the operations on the real graphics card by the VM in the background.

10. The method according to claim 8, wherein the switching module performs switching by invoking a standard BIOS, performing a VGA BIOS, or directly operating the real graphics card so as to save the graphics card state of the GOS in the foreground to be switched to the background into the graphics card state data of the GOS and restoring the graphics card state data of the GOS in the background to be switched to the foreground to the real graphics card.

11. The method according to claim 8, wherein whether the GOS is in the foreground or in the background is determined by an identification set for the VM to which the GOS is pertaining for identifying whether it is in the foreground or in the background.

12. The method according to claim 8, wherein the resource-converting table is saved in a space of the VMM, or is saved in a context environment of the GOS virtual machine.

13. The method according to claim 8, wherein the resource-converting table comprises a virtual machine number, a device number, a Guest IO segment, a Guest MMIO segment, a Guest interrupt number, a Machine IO segment, a Machine MMIO segment, and a Machine interrupt number.

14. A virtual machine system, comprising:
a Service Operating System (SOS), one or more Guest Operating Systems (GOSs), a Virtual Machine Monitor (VMM) and a real graphics card,
the VMM comprising a resource-converting module;
the SOS comprising a display switching drive; and
the GOSs each comprising a display switching drive and a real graphics card drive; wherein,
the real graphics card drives of the GOSs are configured to send graphics card accessing data of the GOSs to the resource-converting module of the VMM,
the resource-converting module of the VMM is configured to store correspondences between Input/Outputs (IOs), Interrupt ReQuests (IRQs) and Memory Mapped Input/Outputs (MMIOs) allocated by the SOS for the real graphics card, and IOs, IRQs and MMIOs allocated by the GOSs for the real graphics card, and to convert IO addresses and MMIO addresses of the graphics card accessing data from the GOSs based on the correspondences and then send the converted IO addresses and MMIO addresses to the real graphics card,
the display switching drive of the SOS is configured to send a message to switch to the foreground to the display switching drive of a GOS to be switched to the foreground by a communication module of the VMM on receipt of a display switching message, and
when a GOS receives a message including an instruction to switch to the background, display switching drives of the GOSs enables the virtual graphics card drives and disables the real graphics card drives, and when the GOS receives a message to switch to the foreground sent by the display switching drive of the SOS through the communication module of the VMM, the display switching drive of the GOS disables the virtual graphics card drives and enable the real graphics card drives.

15. The virtual machine system according to claim 14, wherein when Device Modules (DMs) of the virtual machine system receive the graphics card accessing data sent by the virtual graphics card drives through the communication module of the VMM, the DMs discard the graphics card accessing data.

16. The virtual machine system according to claim 14, wherein,
the resource-converting module of the VMM is further configured to receive interrupt requests (IRQs) from the real graphics card, and convert the IRQs to interrupt numbers for the GOSs based on the stored correspondences and then send them to the real graphics card drives of the GOSs, and
the real graphics card drives of the GOSs are further configured to perform corresponding processing on the IRQs.

17. The virtual machine system according to claim 14, wherein,
the display switching message received by the display switching drive of the SOS is an externally triggered switching message; and
the display switching drive of the SOS is further configured to send the message to switch to the background to the GOS to be switched to the background by the communication module of the VMM.

18. The virtual machine system according to claim 14, wherein,
the message including the instruction to switch to the background received by the display switching drives of the GOSs is a display switching message sent by applications of the GOSs, and
the display switching drives of the GOSs are further configured to send the display switching message to the display switching drive of the SOS by the communication module of the VMM.

19. The virtual machine system according to claim 14, wherein,
the SOS further comprises a saving/restoring module for a graphics card register for saving current values of the graphics card register and restoring the graphics card register values corresponding to the GOS to be switched to the foreground on receipt of a graphics card register saving/restoring signal, and
the display switching drive of the SOS is further configured to send the graphics card register saving/restoring signal to the saving/restoring module for the graphics card register on receipt of the display switching message.

20. The virtual machine system according to claim 14, wherein,
the SOS further comprises a saving/restoring module for a graphics card memory for saving current contents of the graphics card memory and restoring the graphics card memory contents corresponding to the GOS to be switched to the foreground on receipt of a graphics card memory saving/restoring signal, and
the display switching drive of the SOS is further configured to send the graphics card memory saving/restoring signal to the saving/restoring module for the graphics card memory on receipt of the display switching message.

21. The virtual machine system according to claim 14, wherein,
the display switching drive of each GOS is further configured to determine whether switching requirements are satisfied or not when the present GOS is in the foreground and the display switching is to be performed, and if the switching requirements are satisfied, the normal switching is performed, while if the switching requirements are not satisfied, the switching will not be performed.

22. A method for sharing a real graphics card amongst virtual machines, comprising:
allocating the real graphics card to GOSs, also allocating virtual graphics cards to the GOSs, and loading corresponding real graphics card drives and virtual graphics card drives;
on display switching, disabling the real graphics card drive of a GOS in the background and enabling the virtual graphics card drive of the GOS in the background, as well as disabling the virtual graphics card drive of a GOS in the foreground and enabling the real graphics card drive of the GOS in the foreground;
the GOS in the background accessing the virtual graphics card by the virtual graphics card drive, and an SOS discarding graphics card accessing data of the GOS in the background;
the GOS in the foreground accessing the real graphics card by the real graphics card drive, comprising the sub-steps of:
(a) sending graphics card accessing data of the GOS in the foreground to a VMM by the real graphics card drive; and
(b) the VMM converting IO addresses and MMIO addresses of the graphics card accessing data based on correspondences between Input/Outputs (IOs), Interrupt ReQuests (IRQs) and Memory Mapped Input/Outputs (MMIOs) allocated by the SOS for the real graphics card, and IOs, IRQs and MMIOs allocated by the GOS in the foreground for the real graphics card, and then sending the converted IO addresses and MMIO addresses to the real graphics card.

23. The method according to claim 22, wherein, after the sub-step (b), it further comprises sub-steps of:
the VMM receiving IRQs from the real graphics card, converting the IRQs to interrupt numbers for the GOS in the foreground based on the correspondences, and then sending them to the real graphics card drive of the GOS in the foreground, which in turn performs corresponding processing on the IRQs.

24. The method according to claim 22, wherein, before the sub-step (a), it further comprises sub-steps of:
saving a displaying mode corresponding to the GOS in the foreground when the GOS in the foreground is switched to the background and restoring a displaying mode corresponding to the GOS in the background when the GOS in the background is switched to the foreground.

25. The method according to claim 22, wherein, before the sub-step (a), it further comprises sub-steps of:
saving the graphics card memory contents corresponding to the GOS in the foreground when the GOS in the foreground is switched to the background and restoring the graphics card memory contents corresponding to the GOS in the background when the GOS in the background is switched to the foreground.

26. The method according to claim 22, wherein, before the display switching, it further comprises:
the GOS in the foreground determining whether switching requirements are satisfied or not, and if the switching requirements are satisfied, the normal switching is performed, while if the switching requirements are not satisfied, the switching will not be performed.

27. The method according to claim 26, wherein, the switching requirements are that:
none of applications of the present GOS uses the real graphics card exclusively; and/or
none of the applications of the present GOS uses displaying properties which are not supported by the virtual graphics card; and/or
the virtual graphics card of the present GOS is properly loaded.

* * * * *